United States Patent [19]

Yamada et al.

[11] Patent Number: 5,468,130
[45] Date of Patent: Nov. 21, 1995

[54] COATING STRUCTURE FOR A MOVABLE MEMBER IN A COMPRESSOR

[75] Inventors: Kiyohiro Yamada; Masao Iguchi; Izuru Shimizu; Yasushi Watanabe, all of Kariya, Japan

[73] Assignee: Kabushiki Kaisha Toyoda Jidoshokki Seisakusho, Kariya, Japan

[21] Appl. No.: 293,645

[22] Filed: Aug. 22, 1994

[30] Foreign Application Priority Data

Aug. 23, 1993 [JP] Japan .................. 5-208062

[51] Int. Cl.⁶ .................... F01C 1/04
[52] U.S. Cl. .............. 418/55.2; 418/55.3; 418/178; 418/179; 428/652
[58] Field of Search ............... 418/55.2, 55.3, 418/55.5, 178, 179; 428/652

[56] References Cited

U.S. PATENT DOCUMENTS 4,325,683  4/1982  Miyazawa .................. 418/55.3
5,382,144  1/1995  Tanaka et al. ............. 418/179

FOREIGN PATENT DOCUMENTS 0159780   7/1987  Japan ................... 418/55.2
62-199982 9/1987  Japan .
0248886  10/1987  Japan ................... 418/178
392590   4/1991  Japan .
586483   4/1994  Japan .

Primary Examiner—Charles Freay
Attorney, Agent, or Firm—Brooks Haidt Haffner & Delahunty

[57] ABSTRACT

A movable member slides on a fixed member. The movable member is made of aluminum alloy. An inner layer coats the movable member. The inner layer is made of a material capable of adhering to the aluminum alloy. An outer layer coats the inner layer and contacts the fixed member. The outer layer has greater hardness than the hardness of the inner coating layer.

23 Claims, 6 Drawing Sheets

COATING STRUCTURE FOR A MOVABLE MEMBER IN A COMPRESSOR

BACKGROUND OF THE INVENTION

1. Field of the Invention

The present invention relates to an apparatus in which a movable member slides on a fixed member. More particularly, the present invention relates to a coating structure for the movable member. For example, a scroll type compressor has a movable scroll that slidably contacts a fixed scroll when compressing refrigerant gas between both the movable scroll and the fixed scroll. The present invention can be applied to such a compressor.

2. Description of the Related Art

Conventional scroll type compressors generally include a fixed scroll, and a movable scroll which engages the fixed scroll. When the movable scroll performs the orbital movement (referring to "revolution," hereinafter) while the spiral element of the movable scroll engages the spiral element of the fixed scroll, refrigerant gas is compressed between both the movable scroll and the fixed scroll. In recent scroll type compressors, the movable scroll revolves at high speed in order to increase the discharge capacity of the compressor. To ensure the smooth revolution of the movable scroll, the movable scroll may be formed of light materials, such as aluminum.

The wear-resistance of aluminum, however, is relatively low. Forming layers on the surfaces of both the scrolls has been proposed to improve the wear-resistance of the movable scroll made of aluminum.

Japanese Unexamined Patent Publication No. 5-86483 discloses a structure that coats the surface of the movable scroll in a scroll type compressor by use of plating. According to this structure, as shown in FIG. 8, an inner nickel-phosphorus alloy plating layer 22 containing silicon carbide particles covers the surface of the movable scroll 7 made of aluminum. The surface of the inner layer 22 is covered with an outer nickel-phosphorus alloy layer 23. The nickel-phosphorus alloy has a good adhesion to the aluminum alloy. However, due to relatively low hardness of the outer nickel-phosphorus alloy layer 23, the layer 23 has less wear-resistance.

Furthermore, Japanese Unexamined Patent Publication No. 3-92590 discloses a structure in which nickel-phosphorus alloy coats a contact surface of a fixed scroll or a movable scroll by use of chemical plating. The plated surface also has less wear resistance.

SUMMARY OF THE INVENTION

It is, therefore, an object of the present invention to provide an apparatus, such as a compressor, in which a coating layer formed on a surface of a movable member, such as a movable scroll, can apply excellent peeling resistance and wear resistance to the movable member.

To achieve the foregoing and other objects, an improved coating structure for a movable member is provided. A movable member slides on a fixed member. The movable member is made of aluminum alloy. An inner layer coats the movable member. The inner layer is made of a material capable of adhering to the aluminum alloy. An outer layer coats the inner layer and contacts the fixed member. The outer layer has greater hardness than the hardness of the inner layer.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENT

Figure 1:
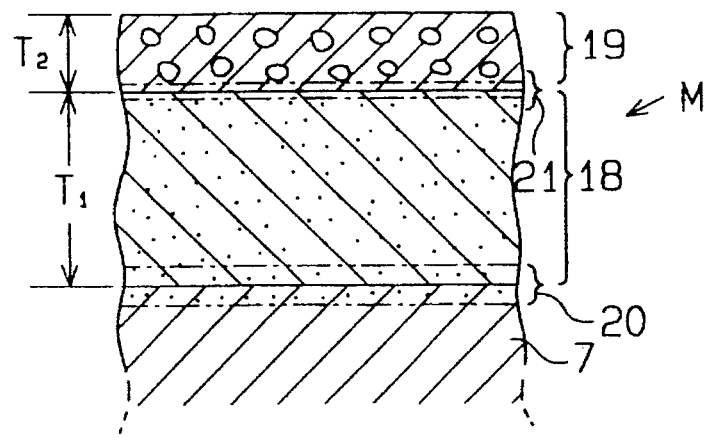
FIG. 1 is an enlarged fragmentary cross-sectional view showing a scroll type compressor according to an embodiment of the present invention.
Figure 2:
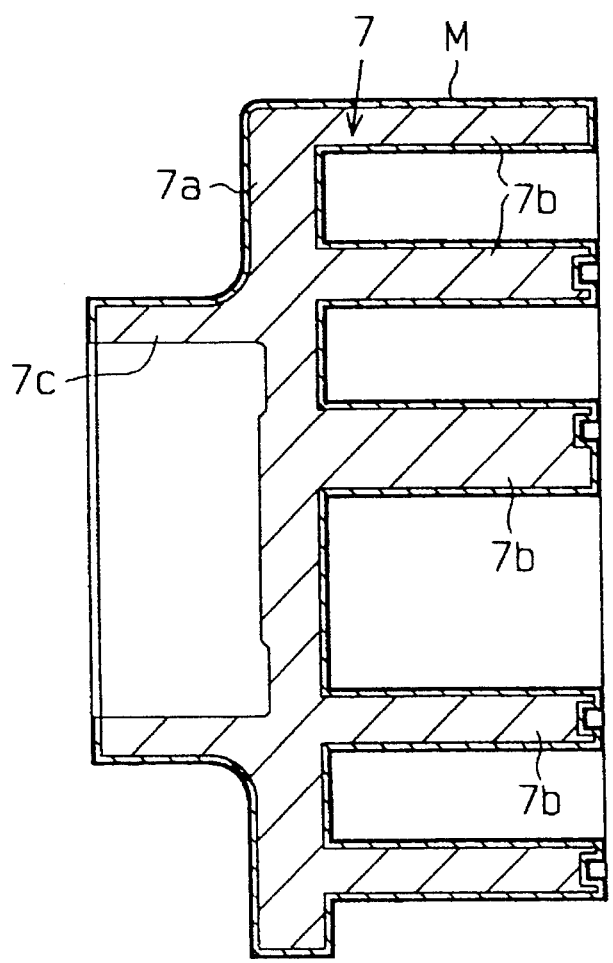
FIG. 2 is a cross-sectional side view showing a movable scroll of the compressor.
Figure 3:
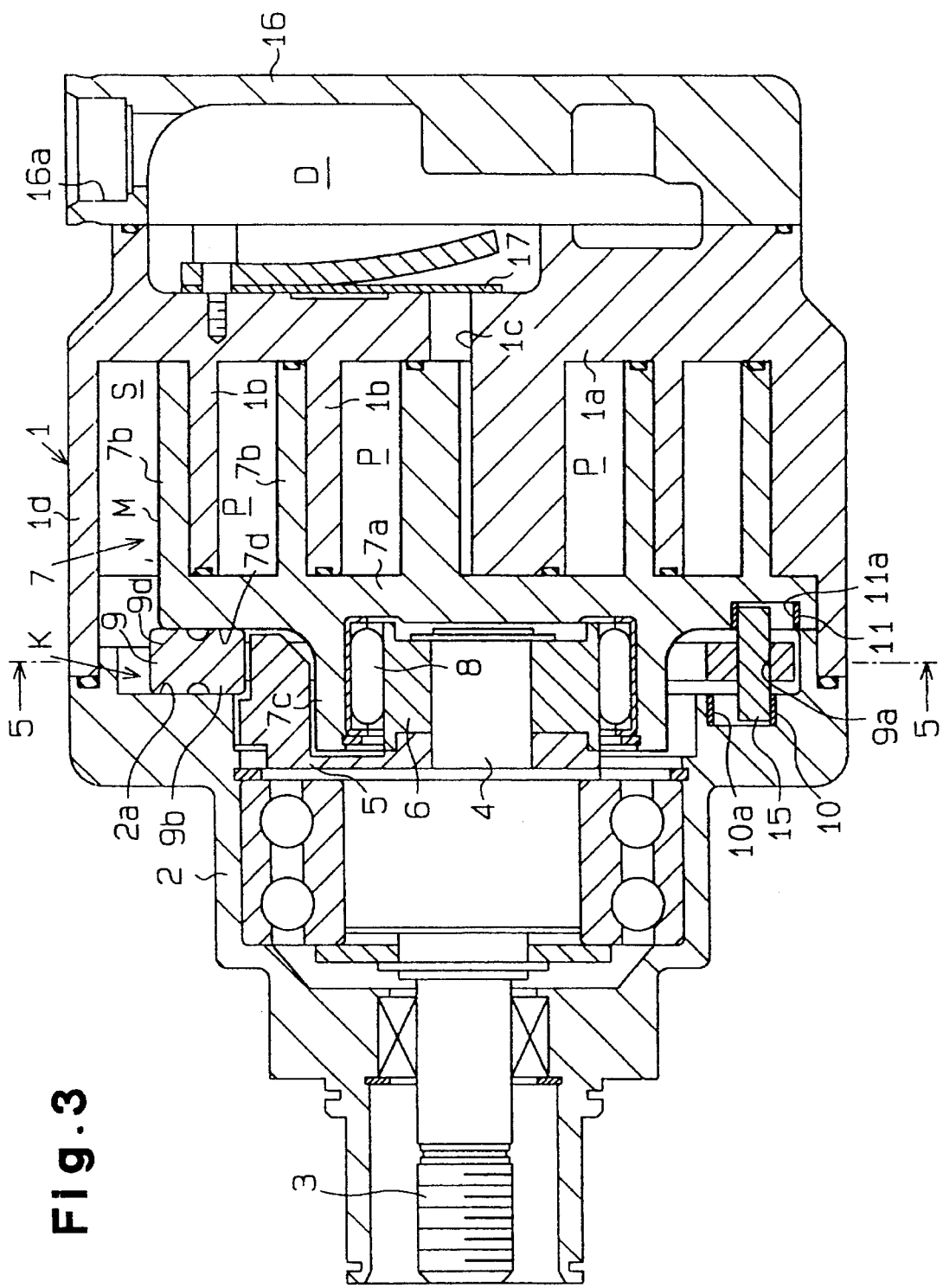
FIG. 3 is a side cross-sectional view showing the entire compressor.

A scroll type compressor according to one embodiment of the present invention will now be described referring to FIGS. 1 through 7. As shown in FIG. 3, a front housing 2 is secured to a fixed scroll 1, made of an aluminum alloy, which serves as a center housing 1d. A rotary shaft 3 is rotatably supported in the front housing 2, with an eccentric shaft 4 secured to the rotary shaft 3.

A balancing weight 5 and a bushing 6 are supported by the eccentric shaft 4. A movable scroll 7, made of aluminum alloy, is supported in a revolutionary manner by the bushing 6 via radial bearings 8. The movable scroll engages the fixed scroll 1. The fixed scroll 1 comprises a base plate 1a and a spiral element 1b formed integrally with the base plate 1a, and the movable scroll 7 also comprises a base plate 7a and a spiral element 7b formed integrally with the base plate 7a. A boss portion 7c is integrally formed with the base plate 7a of the movable scroll 7. The boss portion 7c fits the bushing 6. Compression chambers P are defined by base plates 1a and 7a and the spiral elements 1b and 7b. The volume of the compression chamber P decreases as the chamber shifts toward the center from the peripheral portion of the compressor during the revolution of the movable scroll 7.

The back surface of the base plate 7a comprises a movable wall 7d. The inner surface of the front housing 2 comprises a fixed wall 2a. A rotation preventing mechanism K, disposed between both the walls 7a and 2a, which prevents the rotation of the movable scroll 7 around its axis but permits the revolution thereof. This rotation preventing mechanism K has a plurality of cylindrical collars (four in this embodiment) 10, fitted on the fixed wall 2a, and a plurality of cylindrical collars 11, fitted on the movable wall 7d, eccentric to the collars 10 at a predetermined distance.

Figure 4:
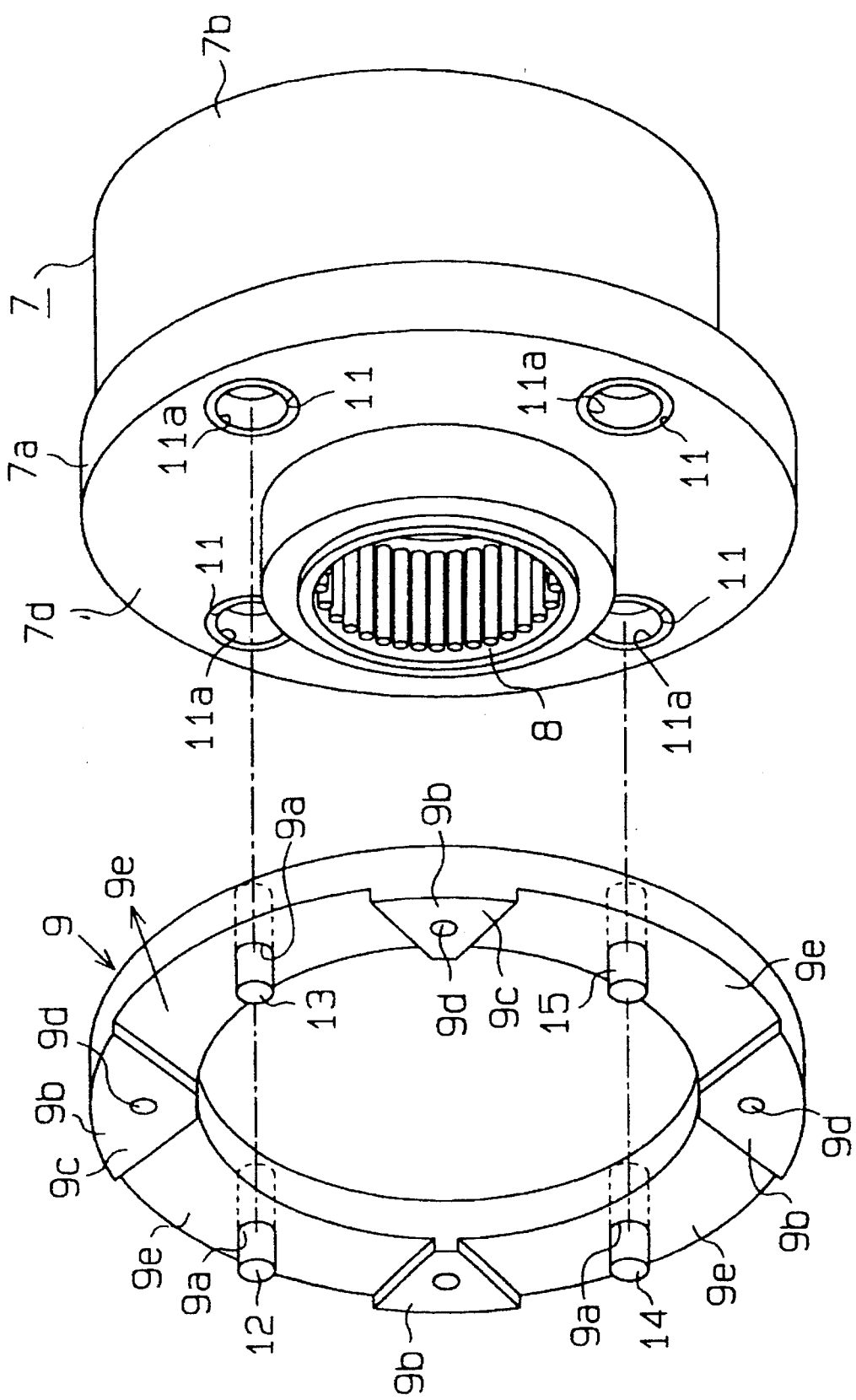
FIG. 4 is an exploded perspective view showing parts of the compressor.

Intervened between the collars 10 and the collars 11 is a ring 9 of aluminum alloy shown in FIG. 4. This ring 9 has a plurality of through holes (four in this embodiment) 9a through which pins 12 to 15 are securely fitted. The pins 12–15 are loosely engaged with holes 10a of the collars 10 and holes 11a of the collars 11. Pressure receiving elements 9b are formed integrally with the ring 9 at the front and rear surfaces of the ring 9, at equiangular distances.

The pressure receiving elements 9b transmit the pressure in the compression chambers P to the fixed wall 2a from the movable wall 7d. Each pressure receiving element 9b has a sliding surface 9c where a small hole 9d for reserving a lubricating oil is formed. A plurality of shallow recesses 9e are formed with the ring 9 between the pressure receiving elements 9b, so that refrigerant gas is supplied from the recesses 9e to between the pins 12–15 and the holes 10a and 11a.

A suction port, not illustrated, is formed in the front housing 2, and a suction chamber S is defined between the movable scroll 7 and the front housing 2. Securely connected to the rear of the fixed scroll 1 is a rear housing 16 to define a discharge chamber D. A discharge hole 1c is formed with the base plate 1a. A discharge valve 17 for opening or closing the discharge hole 1c is provided in the discharge chamber D. A discharge port 16a is formed with the rear housing 16.

A coating structure applied to the movable scroll 7 will now be described mainly referring to FIGS. 1 and 2. A composite plating layer M is formed on the surfaces of the base plate 7a, spiral element 7b and boss portion 7c of the movable scroll 7. This composite plating layer M comprises an inner plating layer 18 and an outer plating layer 19. The inner layer, made of a nickel-phosphorus (Ni—P) alloy, is formed on the surface of the movable scroll 7 made of the aluminum-alloy base metal. The outer layer 19, made of nickel-boron (Ni—B) alloy, is formed on the surface of the inner layer 18.

In this embodiment, the aluminum alloy base metal for each scroll 1, 7 contains 8.5 to 13.5% by weight of silicon (Si), 4.0 to 6.0% by weight of copper (Cu), 0.50 to 1.0% by weight of magnesium (Mg), and 79.5 to 87% by weight of aluminum. The nickel-phosphorus alloy contains 91 to 92% by weight of nickel and 8 to 9% by weight of phosphine. The nickel-boron alloy contains 99.5% by weight of nickel and 0.5% by weight of boron.

The inner layer 18 has excellent adhesion to the aluminum-alloy base metal, and an adhesion layer 20 is formed between the inner layer 18 and the base metal. The outer layer 19 also has excellent adhesion to the inner layer 18, and an adhesion layer 21 is formed between both the layers 18 and 19. Further, the outer layer 19 has a rigidity or hardness greater than the rigidity of either of the inner layer 18 and the base metal, which has excellent wear-resistance to the fixed scroll 1. The thickness, $T_2$, of the outer layer 19 is set smaller than the thickness, $T_1$, of the inner layer 18. It is preferable that the thickness of the outer layer is less by 5 μm as compared with the thickness of the inner layer when the thickness of the inner layer is in the range of 10 to 25 μm.

In the thus constituted scroll type compressor, when the rotary shaft 3 rotates, the eccentric shaft 4 revolves and the movable scroll 7 revolves around the rotary shaft 3 while its rotation is prevented by the rotation preventing mechanism K. As a result, the refrigerant gas led into the suction chamber S from the suction port (not shown) flows into each compression chamber P between both scrolls 1 and 7. The compression chamber P decreases its volume while the movable scroll 7 makes its orbital movement. Simultaneously, the compression chamber P is shifted toward the center portions of the spiral elements 1b and 7b. Consequently, the refrigerant gas is compressed in the compression chamber P whose volume has been reduced, and is then discharged into the discharge chamber D via the discharge hole 1c in the base plate 1a.

Figure 5:
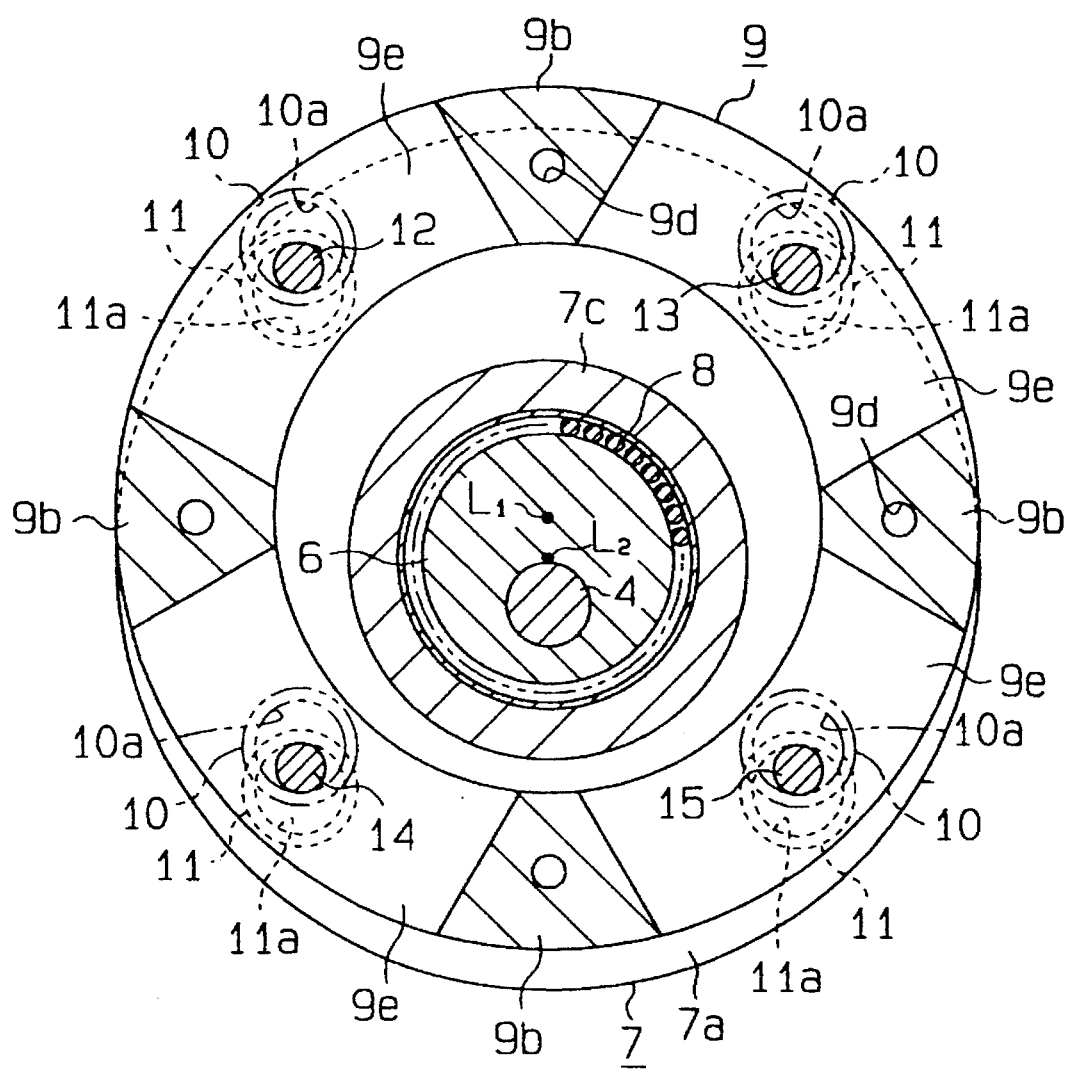
FIG. 5 is a cross-sectional view taken along the line 5—5 of FIG. 3, which illustrates the arrangement of pins and holes of the compressor.

In the situation shown in FIG. 5, the front end portions of the pins 12 to 15 engage the lowermost sections of the holes 10a of the fixed-side collars 10. The rear end portions of the pins 12–15 engage the uppermost sections of the holes 11a of the movable-side collars 11. With respect to the rotation axis $L_1$ of the rotary shaft 3, the bushing 6 and the movable scroll 7 are located at the lowest positions and the center axis $L_2$ of the bushing 6 is also at the lowest position.

Figure 6:
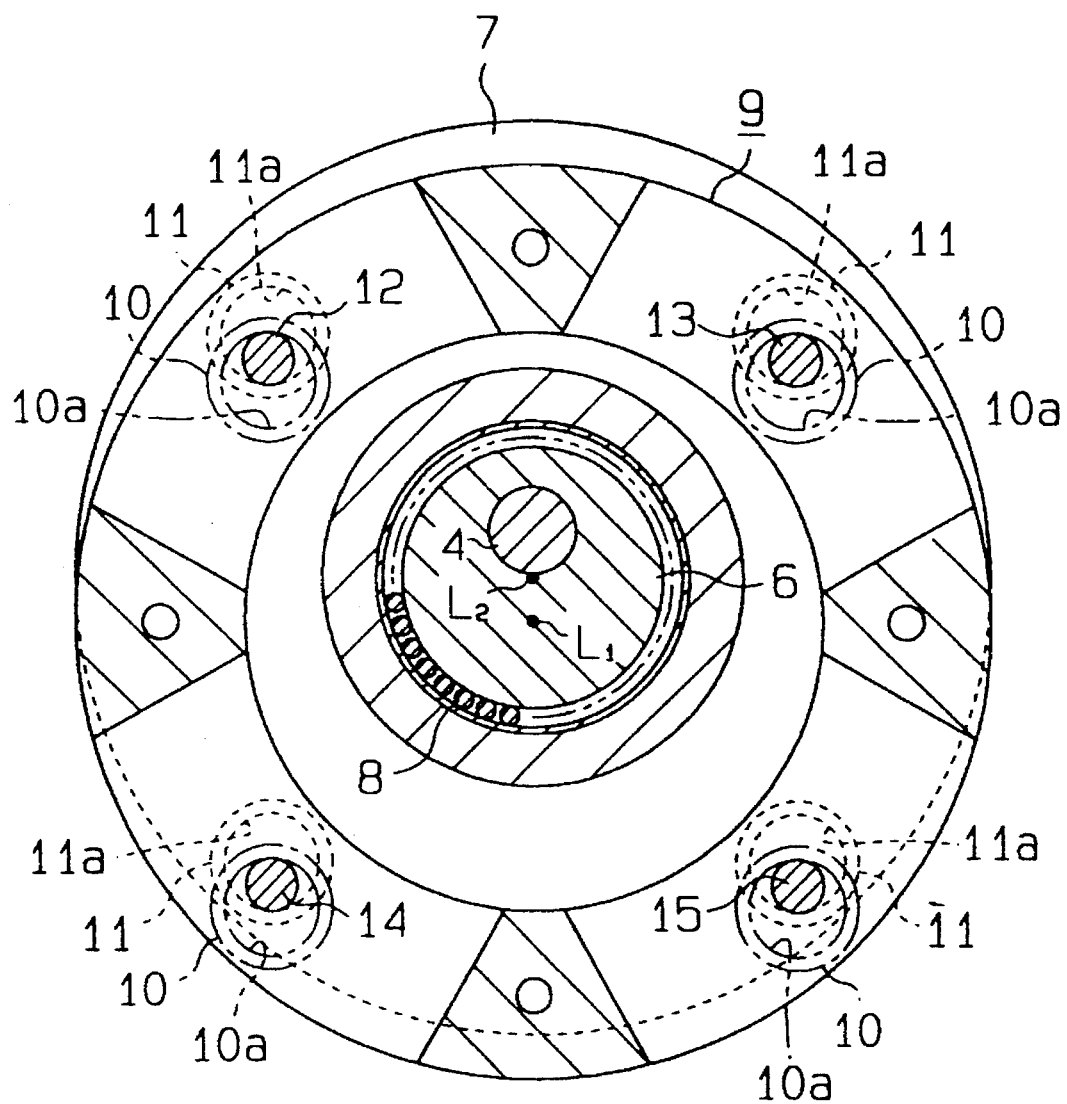
FIG. 6 is a cross-sectional view showing the arrangement of pins and holes after the drive shaft of the compressor rotates 180 degrees from the position illustrated in FIG. 5.

As the rotary shaft 3 rotates, the eccentric shaft 4 rotates clockwise in FIG. 5 together with the bushing 6. When the center axis $L_2$ of the bushing 6 comes to the uppermost position according to the rotation of the eccentric shaft 4 by 180 degrees, the front ends of the pins 12–15 engage with the uppermost sections of the holes 10a and the rear ends of the pins 12–15 engage with the lowermost sections of the holes 11a, as shown in FIG. 6.

The collars 10, 11 and the associated pins 12–15 continue to engage each other, even when the position of the eccentric shaft 4 continuously changes. Consequently, the movable scroll 7 makes its orbital movement with a predetermined radius (the distance between the axes $L_1$ and $L_2$) while its rotation is prevented. According to this embodiment, the inner layer 18 of the nickel-phosphorus alloy, which has excellent adhesion to the aluminum-alloy base metal, is formed on the surface of the movable scroll 7. The outer layer 19 of the nickel-boron alloy, which has excellent adhesion to the inner layer 18 and has rigidity greater than that of the inner layer 18, is formed on the surface of the inner layer 18. This structure improves the peeling resistance of the composite plating layer M and also improves the wear-resistance against the sliding motion between the movable scroll 7 and the fixed scroll 1.

In particular, when cracks are erroneously created on the outer layer 19, the propagation to the inner layer 18 having less rigidity can be suppressed because of its smaller rigidity. Accordingly, improved durability can be achieved. According to this embodiment, the composite layer M having high peeling resistance and wear-resistance is formed on the movable wall 7d. Accordingly, stable sliding operation between the pressure receiving elements 9b of the ring 9 and the movable wall 7d can be guaranteed for a long period of time and the durability of both the elements 9b and the wall 7d can be improved.

Figure 7:
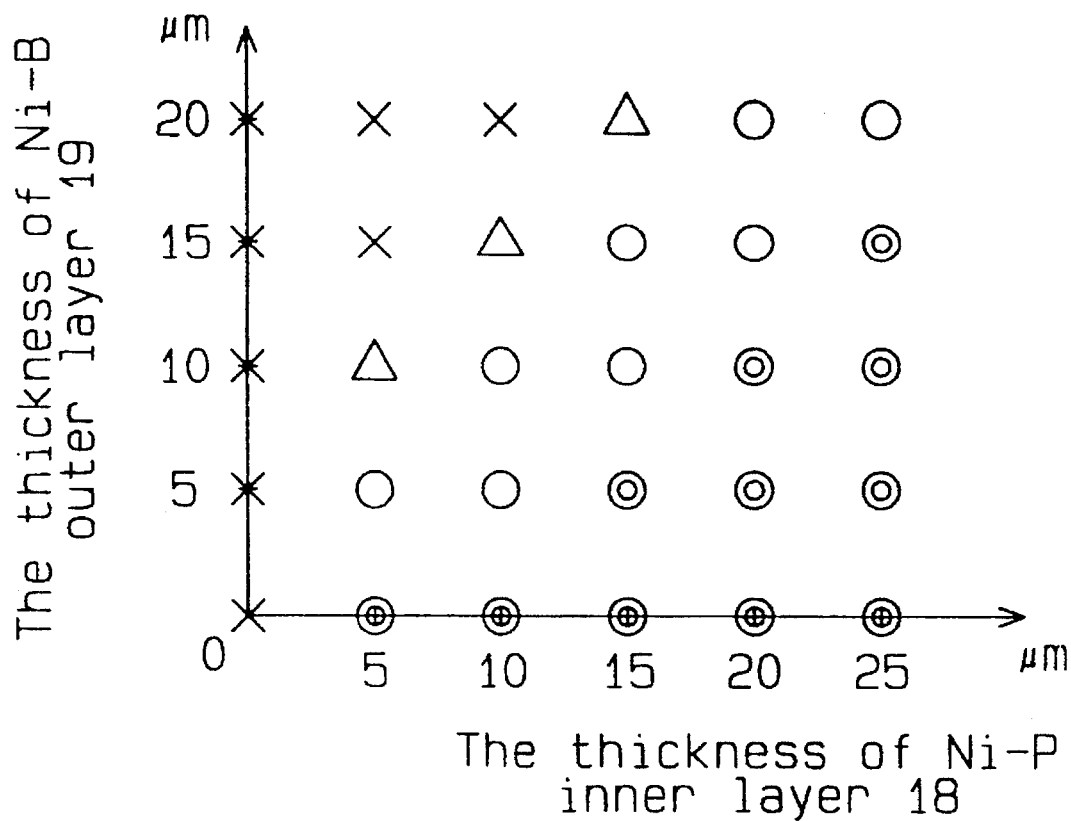
FIG. 7 is a diagram showing the relationship between the thicknesses and the peeling resistance of the plating layers.
Figure 8:
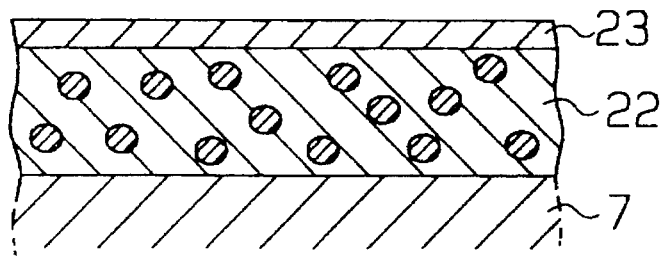
FIG. 8 is an enlarged fragmentary cross-sectional view showing conventional plating layers.

Furthermore, since the thickness $T_2$ of the outer layer 19 is set smaller than the thickness $T_1$ of the inner layer 18 in this embodiment, peeling resistance can be improved. The peeling resistance was evaluated by measuring the peeling strength of both layers 18, 19 while changing the thickness of each layer in the range of 0 to 25 μm or 0 to 20 μm, as shown in FIG. 7. The results are also shown in FIG. 7. It is apparent from FIG. 7 that when the thickness $T_2$ of the outer plating layer 19 is set smaller than the thickness $T_1$ of the inner plating layer 18, the peeling resistance is improved as indicated by "⊚". In FIG. 7, "○" shows good peeling resistance, "Δ" indicates slightly poor peeling resistance, and "X" indicates poor peeling resistance. The present invention is not limited to the above-described embodiment, but may be embodied in the following specific forms.

(1) The composite plating layer M may be formed on the fixed wall 2a of the front housing 2.

(2) The composite layer M may be formed on the fixed scroll.

(3) While the inner plating layer 18 is formed of nickel-phosphorus (Ni—P), the outer plating layer 19 may be formed of nickel-phosphorus-silicon nitride (Ni—P—Si$_3$N$_4$) alloy, nickel-phosphorus-boron nitride (Ni—P—BN) alloy, nickel-phosphorous-cobalt (Ni—P—Co) alloy or the like. Alternatively, the inner plating layer 18 may be formed of nickel-phosphorus-cobalt (Ni—P—Co) alloy and the outer plating layer 19 may be formed of the aforementioned nickel-boron (Ni—B) alloy, nickel-phosphorus-silicon nitride (Ni—P—Si$_3$N$_4$) alloy, nickel-phosphorus-boron nitride (Ni—P—BN) alloy, or the like, which has a rigidity greater than the inner layer 18.

(4) The present invention may be applied to a sliding vane compressor. In this case, the composite plating layer M is formed on the outer surface of a rotor. The rotor having vanes is rotatable in the cylinder and slidable along the inner wall of the cylinder. The present invention may also be applied to a swash plate type compressor. The composite plating layer M can be formed on the surface of the swash plate on which the shoes slide. The shoes connect pistons to the swash plate.

What is claimed is:

1. A compressor having a movable member that slides on a fixed member, said compressor comprising:

said movable member being made of aluminum alloy;

an inner layer coating said movable member, said inner layer being made of a material capable of adhering to the aluminum alloy; and an outer layer coating said inner layer and contacting the fixed member, said outer layer having greater hardness than the inner layer.

2. A compressor according to claim 1, wherein said inner layer is made of nickel-phosphorus alloy, and said outer layer is made of nickel-boron alloy.

3. A compressor according to claim 2, wherein said inner layer is thicker than the outer layer.

4. A compressor according to claim 2, wherein both said layers are produced by plating.

5. A scroll type compressor having a movable scroll eccentrically mounted on a rotary shaft to perform an orbital movement about an axis of the rotary shaft without rotating about an axis of the movable scroll, wherein the movable scroll slides on a fixed scroll to continuously reduce a volume of a compression chamber defined between two scrolls, whereby refrigerant gas is compressed in the compression chamber, said compressor comprising:

said movable scroll being made of aluminum alloy;

an inner layer coating on said movable scroll, said inner layer being made of a material capable of adhering to the aluminum alloy; and an outer layer coating on said inner layer and contacting the fixed scroll, the outer layer having greater hardness than the inner layer.

6. A compressor according to claim 5, wherein said inner layer is made of nickel-phosphorus alloy, and said outer layer is made of nickel-boron alloy.

7. A compressor according to claim 6, wherein said inner layer is thicker than said outer layer.

8. A compressor according to claim 5 further comprising:

a movable wall formed with said movable scroll;

a fixed wall, disposed adjacent to said movable wall and opposed to the fixed scroll via the movable scroll, for receiving a pressure of the compressed refrigerant gas acting on said movable scroll; and a ring, disposed between said movable wall and said fixed wall, for transmitting said pressure from said movable scroll to said fixed wall via said movable wall.

9. A compressor according to claim 8 further comprising a plurality of projections abutting the movable wall and the fixed wall.

10. A compressor according to claim 9, wherein said projections respectively have first recesses for holding lubricant in cooperation with the movable wall.

11. A compressor according to claim 9, wherein said projections respectively have second recesses for holding lubricant in cooperation with the fixed wall.

12. A scroll type compressor having a movable scroll eccentrically mounted on a rotary shaft to perform orbital movement about an axis of the rotary shaft without rotating about an axis of the movable scroll, wherein the movable scroll slides on a fixed scroll to continuously reduce a volume of a compression chamber defined between said two scrolls, whereby refrigerant gas is compressed in the compression chamber, said compressor comprising:

said movable scroll being made of aluminum alloy and having a movable wall formed integrally therewith;

a fixed wall, disposed adjacent to the movable wall and opposed to said fixed scroll via the movable scroll, for receiving a pressure of the compressed refrigerant gas acting on the movable scroll;

a ring, disposed between the movable wall and the fixed wall, for transmitting said pressure from the movable scroll to the fixed wall via the movable wall;

an inner layer coating the movable scroll, said inner layer being made of nickel-phosphorus alloy; and an outer layer coating the inner layer and contacting the fixed scroll, said outer layer being made of nickel boron alloy and having greater hardness than the inner layer.

13. A compressor according to claim 12, wherein said inner layer is thicker than said outer layer.

14. In an apparatus having a movable member and a fixed member having respective engagement surfaces in substantially slidable engagement with each other, the improvement comprising a coating on said engagement surface of one of said members, said one member being of an aluminum alloy, said coating comprising an inner layer of a nickel-phosphorous alloy plated on to said engagement surface of said one member, and an outer layer of a nickel alloy plated on to said inner layer and having a hardness greater than that of said inner layer, said outer layer being in slidable engagement with said engagement surface of the other of said members.

15. The improvement according to claim 14, wherein said inner layer has thickness within the range of from substantially 10 µm to substantially 25 µm, and said outer layer has thickness within the range of from substantially 5 µm to substantially 20 µm.

16. The improvement according to claim 15, wherein said one member is said movable member, and said nickel-phosphorous alloy of said inner layer consists essentially of from substantially 91% to substantially 92% nickel and from substantially 8% to substantially 9% phosphorous.

17. The improvement according to claim 16, wherein said nickel alloy of said outer layer consists essentially of substantially 99.5% nickel and substantially 0.5% boron.

18. The improvement according to claim 15, wherein said one member is said movable member, and said nickel alloy of said outer layer is an alloy consisting essentially of nickel, phosphorous, and silicon nitride.

19. The improvement according to claim 15, wherein said one member is said movable member, and said nickel alloy of said outer layer is an alloy consisting essentially of nickel, phosphorous, and boron nitride.

20. The improvement according to claim 15, wherein said one member is said movable member, and said nickel alloy of said outer layer is an alloy consisting essentially of nickel, phosphorous, and cobalt.

21. The improvement according to claim 15, wherein said one member is said movable member, said nickel-phosphorous alloy of said inner layer is an alloy consisting essentially of nickel, phosphorous, and cobalt, and said nickel alloy of said outer layer is an alloy consisting essentially of nickel and boron.

22. The improvement according to claim 15, wherein said one member is said movable member, said nickel-phosphorous alloy of said inner layer is an alloy consisting essentially of nickel, phosphorous, and cobalt, and said nickel alloy of said outer layer is an alloy consisting essentially of nickel, phosphorous, and silicon nitride.

23. The improvement according to claim 15, wherein said one member is said movable member, said nickel-phosphorous alloy of said inner layer is an alloy consisting essentially of nickel, phosphorous, and cobalt, and said nickel alloy of said outer layer is an alloy consisting essentially of nickel, phosphorous, and boron nitride.

* * * * *